March 20, 1934.  J. E. LODGE  1,951,427
MATERIAL WORKING APPARATUS
Filed Dec. 3, 1930
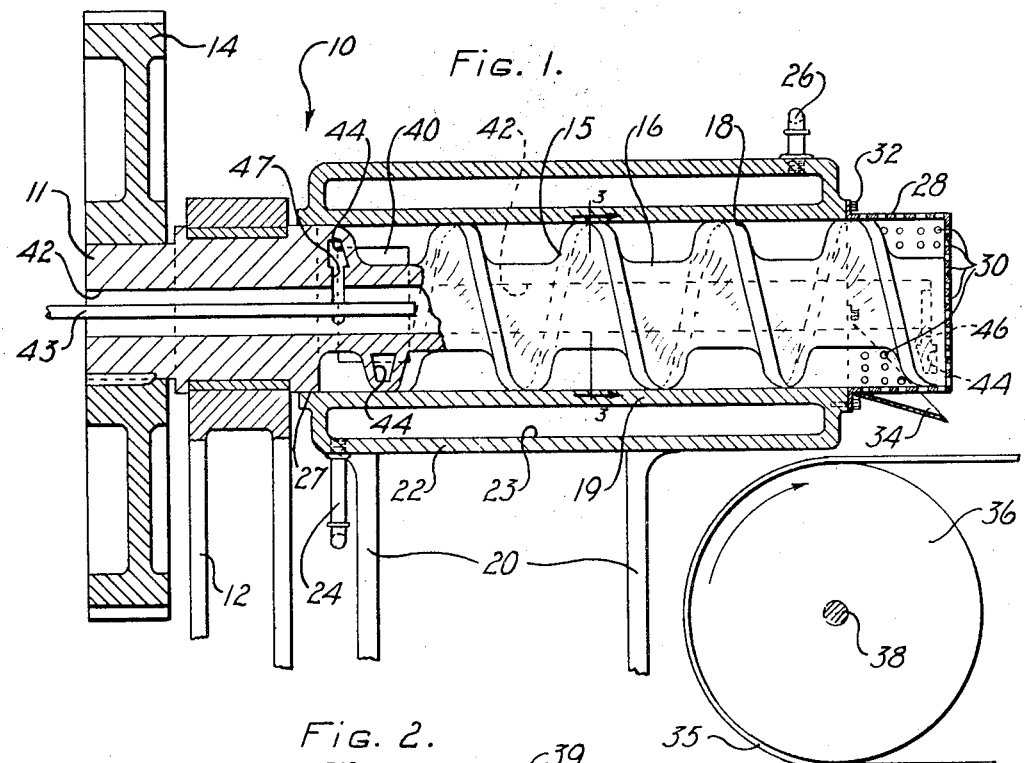
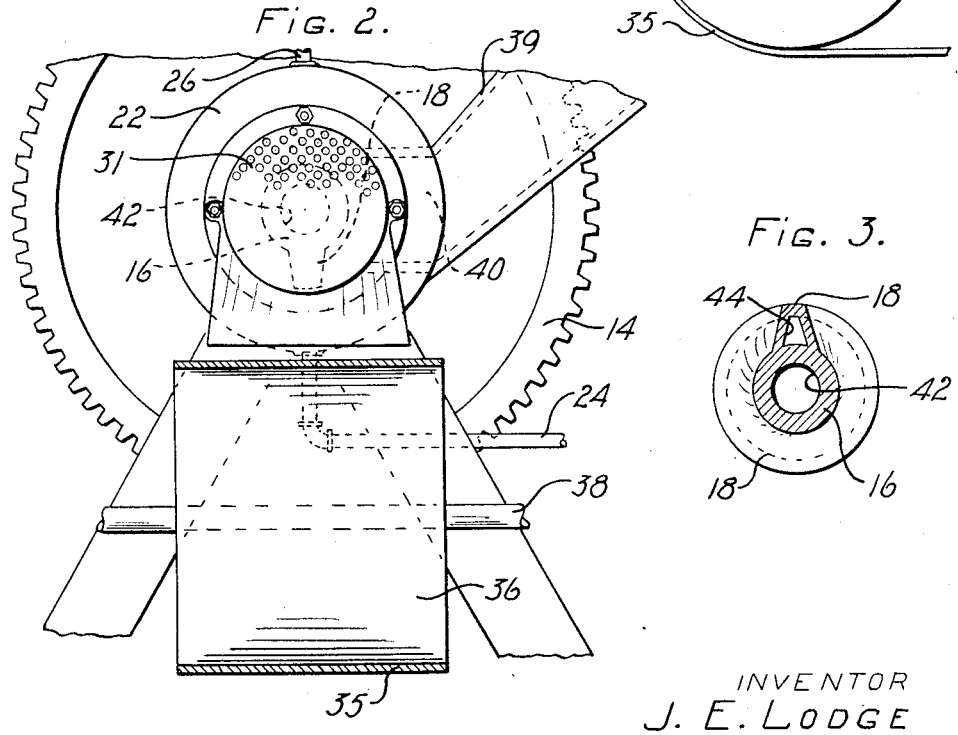
INVENTOR
J. E. LODGE
BY
E. R. Moulan
ATTORNEY Patented Mar. 20, 1934

1,951,427

UNITED STATES PATENT OFFICE 1,951,427

MATERIAL WORKING APPARATUS

Joseph E. Lodge, Baltimore, Md., assignor to Western Electric Company, Incorporated, New York, N. Y., a corporation of New York Application December 3, 1930, Serial No. 499,654

8 Claims. (Cl. 18—12)

This invention relates to a material working apparatus and more particularly to an extruding apparatus for hydrocarbon compounds in plastic form.

In the manufacture of rubber covered wire it is the practice in some instances to mix the raw materials of the covering, i. e., rubber, reclaimed rubber, etc., in a macerator and pass the macerated plastic product to an extruding press, wherein the mass is extruded by a worm through a strainer, as for removing dirt or debris from the mass. Due to pressure and the friction between worm and material, considerable heat is generated and care has to to be exercised to prevent the temperature from rising too high.

An object of the present invention is to provide a material working apparatus which will be simple, compact and efficient.

In accordance with features of the invention, one embodiment includes a worm having a hollow longitudinal core and a hollow integral spiral on the core, interconnected with the aperture of the core at either end, to form a channel for one-way circulation of cooling fluid through the core and the spiral. Specifically, plastic material is fed to an extruding machine at one end and is passed along by a worm to the extruding end thereof, which is provided with a perforated straining member secured in the end of the machine. The worm is cooled by a current of cold water which flows from a stationary feed pipe centered in the core of the worm, along the core to the extruding end, through a slot in the side of the core and into the spiral fin at the outer end thereof. Returning, the water flows through the spiral fin to the inner end of the worm, whence it is conducted away.

The invention will be more clearly understood by reference to the following detailed specification and the accompanying drawing, forming a part thereof, in which Fig. 1 is a fragmentary schematic sectional view of an extruding apparatus, constituting one embodiment of the invention;

Fig. 2 is a fragmentary schematic end elevation taken from the right of Fig. 1, and Fig. 3 is a section taken on the line 3—3 of Fig. 1, showing the hollow fin and the hollow core of the worm.

Referring to the drawing, wherein similar parts are indicated by identical reference numerals throughout the several views, an extruding press, generally designated by the numeral 10, is provided with a worm block 11 rotatably supported in a bearing 12, the bearing 12 being suitably mounted, in a well known manner, upon any desired type of base or foundation (not shown). A gear 14 is keyed to the inner end of the worm block 11 for driving a worm 15, which projects from the outer end of the block. This worm consists of a cylindrical core 16 upon the exterior of which is mounted, preferably by welding, a spiral fin 18 which is a continuous member and extends from the worm block 11 to the outer end of the worm core. A cylinder 19, sustained on rigid supports 20—20, is provided externally with an encircling shell 22 which is spaced therefrom so as to provide a chamber 23. At the inner end the shell is fitted with an inlet pipe 24 and at the outer end with an outlet pipe 26, which pipes are connected in any conventional supply system (not shown) for maintaining a preferably continuous flow of cooling fluid, such as cold water, in the chamber 23 and about the cylinder 19. The interior of the cylinder 19 and the extreme edge of the spiral fin are accurately machined, and the worm block 11 extends a relatively small distance into and engages the inner surface of the cylinder at 27 with a close fit, in order to insure that when the worm is disposed within the cylinder as shown, and rotated in a clockwise direction, the fin will thrust all material in the cylinder toward the outer end of the press.

A material strainer 28, having a perforated periphery 30, a perforated end 31 and a projecting flange 32 is mounted on the outer end of the cylinder and in close engagement with the outer end of the worm by bolting or otherwise suitably securing the flange 32 to the outer end of the cylinder. Depending from the strainer 28 and suitably secured upon the flange portion 32 thereof is an inclined guide 34 for depositing plastic material extruded through the strainer upon a continuous conveyor 35 of any suitable type which is carried by a roller 36, rotatable upon a fixed shaft 38, for carrying away the extruded material. To the right of the cylinder, as viewed in Fig. 2, is provided a chute 39 for furnishing a supply of material to be extruded, to the press. At the lower end of the chute 39, a pipe 40, extending through the shell and the cylinder, is provided for permitting the material to pass from the chute to the interior of the cylinder.

The worm block and core are provided with a continuous longitudinal aperture 42 which extends along substantially the combined lengths thereof. Suitably stationed in the aperture in the worm block is a supply pipe 43 which extends, as shown in Fig. 1, toward the worm an appreciable distance beyond the pipe 40. As best shown in Fig. 3, the spiral fin is provided with a central aperture 44, which extends from end to end of the fin and thereby forms a spiral channel for a cooling fluid, such as water, encircling the core. Adjacent the outer end of the spiral fin, the core is provided with a slot 46 in order to provide communication between the central aperture of the core and the spiral aperture of the fin. For a similar purpose the core is provided with a slot 47 at the inner ends of the spiral fin and core.

When, during the operation of the press, a cooling liquid, such as water, is supplied through the pipe 43 under pressure, a stream thereof is projected toward the outer end of the worm. When the gear 14 is actuated to revolve the worm in a clockwise direction as viewed in Figs. 1 and 2, the water flows into the slot 46 and the aperture 44 at the outer end of the spiral fin. Upon continued rotation of the worm, the water flows in the spiral fin toward the inner end of the worm to the slot 47, whereupon it leaves the fin and pours into the core aperture 42, whence it flows through the worm block to a sewer or other receptacle (not shown).

In operation, plastic material to be extruded passes down the chute 39 and into the cylinder at the inner end thereof by way of the aperture 40. The worm is rotated in a clockwise direction, causing the spiral fin thereon to continually engage portions of the material, and advancing them to the outer end of the worm. The outer end of the worm is machined smooth exteriorly and caused to continually rotate upon the inner surface of the strainer end, thus causing the material to be extruded through the strainer, the extruded product falling upon the moving belt as a stringy mass.

The feeding of the material through the cylinder and its extrusion at the end causes the development of considerable heat, and the heat thus generated is intensified at the extremity of the fin. Separating the apertures in the fin and the core throughout the greater part of their length, and slotting the core at spaced points, i. e., at its extremities, renders it possible to provide a circulation of cold water or other suitable fluid continuously through the worm. By permitting water to flow through the core as an entrance path, and through the fin as a return path, a one-way circulation is maintained, whereby the cooling liquid will flow first into the spiral fin at the outer end thereof which is the point at which a great amount of heat is generated, and thence will immediately flow back inside the extremity of the fin. The heat in the fin is thereby continuously dissipated and the worm cooled to such an extent as to render continuous operation of the extruding press for long periods of time practicable.

It will be understood that a worm constructed and cooled in the manner shown is adaptable for use in other than extruding machines of the type shown, that the worm may be supplied with any fluids suitable to either heat or cool the fin as desired, and that the construction of the press and worm is susceptible of numerous modifications without departing from the spirit and scope of the invention as defined in the appended claims.

What is claimed is:

1. A worm having a hollow cylindrical core and a hollow spiral fin on the core, the hollow spiral of the fin communicating with the hollow core at spaced points.

2. A worm including an elongated core having an aperture coaxial with the core extending substantially the entire length thereof, and a spiral fin on the core having a longitudinally extending aperture communicating with the axial aperture of the core at either end thereof.

3. A worm having a core, an external spiral fin on the core having a longitudinal spiral bore completely within the fin to permit passage of the fluid therethrough, and means to admit a fluid to and release it from the bore.

4. A worm comprising a core axially apertured to permit passage of a fluid therethrough, and an external spiral fin on the core having a longitudinally extending aperture to permit passage of the fluid therethrough, the fin aperture communicating with the core aperture but being separated therefrom along the greater length of the worm.

5. In an apparatus for handling material, a cylinder for receiving the material, an aperture at one end of the cylinder, a rotatable worm having a hollow core and a hollow fin on the core, the apertures of the core and fin communicating at spaced points to provide a channel for one-way circulation of a fluid through the worm, means for driving the worm, means for supplying the fluid to the channel, and a water jacket on the cylinder for controlling the temperature of the material.

6. In an apparatus for working material, the combination with a worm having a longitudinally spirally bored fin of means to admit a fluid to and release it from the bore of the fin.

7. A worm having a tubular spiral bore within and completely surrounded by the material of the fin of the worm in combination with means to admit a fluid to and release it from the bore.

8. In an apparatus for extruding material, a cylinder for receiving the material, an aperture at one end of the cylinder, a worm comprising a core and a spiral fin and having a longitudinal spiral bore completely within the fin on the core, and means to admit a fluid to and release it from the bore of the fin.

JOSEPH E. LODGE.